UNITED STATES PATENT OFFICE.

GUSTAV A. WORTELMANN, OF NEW YORK, N. Y.

FIREPROOF PAINT.

1,397,028.     Specification of Letters Patent.     Patented Nov. 15, 1921.

No Drawing.     Application filed December 6, 1920. Serial No. 428,453.

*To all whom it may concern:*

Be it known that I, GUSTAV A. WORTELMANN, a citizen of Germany, and a resident of the borough of Manhattan, city of New York, county and State of New York, have invented certain new and useful Improvements in Fireproof Paint, of which the following is a specification.

The invention as indicated by its title relates to paints and particularly to fire proofing or fire resisting paints, in fact it contemplates a coating for wood, metal, fabric, or any material which it may partially or wholly coat and impregnate and to which it will then give the desired characteristic of resisting comparatively high temperatures.

In producing the composition I utilize as a vehicle a solution of sodium silicate of about 40° Bé. To this fluid which in itself is highly alkaline and fire resistant I add a substantial content of water, very finely powdered or ground asbestos or other forms of powdered magnesium silicates, powdered sodium phosphate and an aqueous solution of magnesium sulfate. This mixture when painted on the surface of any material upon drying forms a hard glass like enamel of the ingredients above mentioned. When exposed to heat the sodium silicate and powdered asbestos are converted into a double silicate of sodium and magnesium while the sodium phosphate and magnesium sulfate forms a magnesium pyrophosphate. Both of these substances formed are highly resistant to fire and heat.

In order that a mixture be formed which may be painted smoothly and evenly a small quantity of any saponified resin or gum together with a trace of glycerin is added. It is to be understood that where I refer to resins and gums herein that these two expressions are to be considered equivalents of each other.

The general proportion of ingredients used is 60 parts by weight of solution of sodium silicate 40° Bé., 40 parts by weight of water, 60 parts by weight of the powdered asbestos or other magnesium silicate, 2 parts by weight of powdered sodium phosphate, 2 parts by weight of 10% solution of magnesium sulfate, 2 parts by weight of a 10% solution of saponified resin, and 1 part by weight of glycerin.

The above statements do not imply however that I could not use the potassium salts wherever sodium salts are mentioned.

In the same manner I could replace the saponified resin or gum and glycerin which are present only for smoothing out and making the mixture more adaptable for painting purposes by similar substances as for instance casein, glue, or other like material.

The paint dries readily and with a smooth surface as does any ordinary paint. It impregnates the fiber of the material to which it is applied, and as the liquid content of the mixture is dispersed either by evaporation or by the absorption into the fiber of the material it provides a fire proofing and a fire resisting element through its impregnations as well as a firm coating by the deposit of the materials which are held in solution and suspension.

This is quite different from the ordinary paints having an oil or hydrocarbon vehicle or solvent, inasmuch as such vehicles would be absorbed by the fiber of the material to which they are applied and increase the inflammability of the material.

The paint herein described may be used upon fabrics as well as wood and metal and causes no disintegration and has no destructive reaction or absorbing influence upon the texture of the fabric.

In conjunction with this mixture any desired pigments may be employed.

For instance, color effect may be secured by employing a silicate, either the terre verte, which is a form of green ochre containing the silicate of iron potassium and magnesium of salt which is a silicate of cobalt and potassium.

In lieu of these or in conjunction therewith, any desired water color pigment may be employed to give the particular color effect desired.

Obviously the paint mixture is subject to modification and change as to its constituent parts and to substitution of elements which have general characterization of the above-outlined formula.

What I claim is:

1. A fire proof paint composed of sodium silicate, water, powdered asbestos, sodium phosphate, magnesium sulfate, saponified resin and glycerin.

2. A fire proof paint which after being applied and allowed to dry forms a glaze which when heated is converted into a double silicate of magnesium and sodium together with magnesium pyrophosphate.

3. A fire proof paint consisting of a solution of sodium silicate, sodium phosphate and magnesium sulfate and holding in suspension finely divided asbestos which mixture has been made suitable for painting purposes by the addition of saponified resins together with some glycerin.

4. A fire proof paint composed of sodium silicate, water, powdered asbestos, sodium phosphate, magnesium sulfate, saponified resin and glycerin and having a coloring pigment.

5. A fire proof paint consisting of 60 parts by weight of solution of sodium silicate 40° Bé., 40 parts by weight of water, 60 parts by weight of powdered asbestos or other magnesium silicate, 2 parts by weight of powdered sodium phosphate, 2 parts by weight of 10% solution of magnesium sulfate, 2 parts by weight of a 10% solution of saponified resin and 1 part by weight of glycerin substantially as set forth and for the purposes specified.

6. A fireproof paint comprising sodium silicate, water, powdered asbestos, sodium phosphate and magnesium sulfate.

This specification signed this 29th day of November, 1920.

GUSTAV A. WORTELMANN.